(12) United States Patent
Stolle et al.

(10) Patent No.: US 8,029,026 B2
(45) Date of Patent: Oct. 4, 2011

(54) THREADED CONNECTIONS AND METHODS FOR FORMING THREADED CONNECTION

(75) Inventors: Joseph W. Stolle, Wharton, TX (US); Steven B. Lonnes, Pearland, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 945 days.

(21) Appl. No.: 10/569,559

(22) PCT Filed: Jul. 2, 2004

(86) PCT No.: PCT/US2004/021363
§ 371 (c)(1), (2), (4) Date: Feb. 27, 2006

(87) PCT Pub. No.: WO2005/035930
PCT Pub. Date: Apr. 21, 2005

(65) Prior Publication Data
US 2007/0007760 A1    Jan. 11, 2007

Related U.S. Application Data

(60) Provisional application No. 60/503,043, filed on Sep. 15, 2003.

(51) Int. Cl.
*F16L 25/12* (2006.01)
*F16L 15/00* (2006.01)
(52) U.S. Cl. .......................... 285/383; 285/330; 285/355
(58) Field of Classification Search ................ 285/24, 285/27, 124.2, 124.4, 124.5, 333, 355, 390, 285/383; 403/307, 293, 296, 342, 343; 439/192, 439/194, 339, 374, 680
See application file for complete search history.

(56) References Cited

U.S. PATENT DOCUMENTS

| | | | | |
|---|---|---|---|---|
| 626,447 | A | | 6/1899 | Strater ........................ 285/124.1 |
| 720,578 | A | | 2/1903 | Greenfield .................... 285/417 |
| 1,054,812 | A | * | 3/1913 | Zierath ........................ 403/184 |
| 1,547,759 | A | * | 7/1925 | Journeay ........................ 285/85 |
| 1,774,664 | A | * | 9/1930 | Parmley ........................ 285/18 |
| 1,781,091 | A | * | 11/1930 | Wilson .................... 285/148.19 |
| 1,982,915 | A | * | 12/1934 | Jenks ................................ 285/3 |
| 2,197,450 | A | * | 4/1940 | Curtis ........................... 285/369 |
| 2,438,679 | A | | 3/1948 | Parker ............................. 285/21 |
| 3,040,284 | A | * | 6/1962 | Connell ........................ 439/320 |
| 3,574,373 | A | | 4/1971 | Derf et al. ..................... 287/117 |

(Continued)

FOREIGN PATENT DOCUMENTS

EP    0060549    9/1982

(Continued)

OTHER PUBLICATIONS

EP Search Report #RS 110658 dated Mar. 1, 2004, 2 pgs.

(Continued)

*Primary Examiner* — James Hewitt

(57) ABSTRACT

Systems related to threaded connections whereby off-center axial alignment of connected components is maintained. In one embodiment, threads on one connection component are timed to match the timing of the threads on the other connection component. The one component has a connection sleeve screwed thereon. Once the one component and the other component are mated in the desired axial alignment such that the threads on each joint form a continuous, unbroken thread, the connection sleeve is screwed onto the other component to form the threaded connection.

3 Claims, 5 Drawing Sheets

U.S. PATENT DOCUMENTS

| | | | |
|---|---|---|---|
| 3,871,692 A | 3/1975 | Brownfield | 285/390 |
| 4,319,772 A | 3/1982 | Weirich et al. | 285/26 |
| 4,507,842 A * | 4/1985 | Werner | 29/451 |
| 4,679,831 A * | 7/1987 | Kielminski | 285/332.2 |
| 4,706,997 A | 11/1987 | Carstensen | 285/13 |
| 4,875,713 A | 10/1989 | Carstensen | 285/55 |
| 5,048,871 A * | 9/1991 | Pfeiffer et al. | 285/39 |
| 5,236,230 A | 8/1993 | Mudge, Jr. et al. | 285/55 |
| 5,655,794 A | 8/1997 | Sell | 285/25 |
| 5,794,985 A | 8/1998 | Mallis | |
| 5,950,744 A * | 9/1999 | Hughes | 175/320 |
| 6,176,524 B1 * | 1/2001 | Tsuru et al. | 285/55 |
| 7,434,848 B2 * | 10/2008 | Boyd | 285/333 |
| 2004/0207202 A1 * | 10/2004 | Parks | 285/391 |
| 2005/0023831 A1 * | 2/2005 | Hughes | 285/330 |
| 2007/0252387 A1 * | 11/2007 | Beard et al. | 285/323 |

FOREIGN PATENT DOCUMENTS

| | | |
|---|---|---|
| EP | 0389074 | 9/1990 |
| WO | WO 9407072 A1 * | 3/1994 |

OTHER PUBLICATIONS

PCT International Search Report & Written Opinion dated Jun. 23, 2005, 9 pgs.

* cited by examiner

THREADED CONNECTIONS AND METHODS FOR FORMING THREADED CONNECTION

This application is the National Stage of International Application No. PCT/US04/021363, filed 2 Jul. 2004, which claims the benefit of U.S. Provisional Patent Application No. 60/503,043, filed 15 Sep. 2003.

FIELD OF THE INVENTION

This invention relates to the field of threaded connections and methods for forming threaded connections. More particularly, this invention relates to threaded connections and methods for forming same whereby off-center axial alignment of connected components is maintained.

BACKGROUND OF THE INVENTION

Typical oilfield connections rely on rotation to screw individual threaded components together. The make-up of these relative rotation connections requires that one or both components undergo rotational movement while the components are screwed together. This rotational movement does not prohibit axial alignment along the centerline of the components during make-up, but it does prohibit axial alignment at any off-center location during the make-up process. This severely limits the number of separate ports/passages into the adjoining components available for wireline or hydraulic communication use. For example, consider the use of a relative rotation based threaded connection between two components, each of which includes a wireline port that passes continuously therethrough at a location 2.54 cm (1 inch) off-center, and through which a wireline is disposed. During the make-up process, relative rotation between the two components causes the wireline ports to rotate in opposite directions along a circular path relative to each other, thus shearing the wireline. Although relative rotation type threaded connections provide high strength with minimal use of a cylindrical cross-section, off-center axial alignment is not possible during make-up.

Typical down-hole connections such as rotary shouldered connections, e.g., API numbered connections, AMERICAN MT, HUGHES H-90, and REED FULL HOLE, all of which are familiar to those skilled in the art, utilize a pin and box connection requiring relative rotational movement.

Stab type pin and box connections which rely on some type of retaining pins or screws to hold the connection together, as is familiar to those skilled in the art, allow for a rotation free connection but lack the strength needed for many down-hole applications, and take up much needed cross sectional area.

Connections are available that do not use relative rotation threaded connections, and thus allow axial alignment during the connection make-up process. In these connections, axial alignment is typically enabled by using a collar that screws onto only one of the mating components. The other mating component has a non-thread type connection that allows the collar to spin freely during the make-up process. Consequently, the non-threaded end requires a sub-optimal connection that necessarily requires a larger fraction of the available cross-sectional area to provide the required strength. This limits the available cross-sectional area for non-connection related engineering purposes, and thus requires a larger diameter design to accommodate the required engineering features, i.e., uses a large footprint design. In most cases a large footprint design dramatically decreases the utility of the engineered component in down-hole applications, and in many cases renders the component unusable.

A need exists for threaded connections that can be made-up while off-center alignment of connected components is maintained. An objective of this invention is to provide such threaded connections and methods of making same.

SUMMARY OF THE INVENTION

The present invention pertains to threaded connections that allow for maintenance of off-center axial alignment during the make-up process. A benefit of the present invention is that it preserves the inherent strength of relative rotation based threaded type connections, as well as the valuable low profile nature resulting from the characteristic annular geometry of engaged threads. As used in describing this invention, ports, passages, etc. that must extend from one component into one or more adjoining components for wireline or hydraulic communication use, for example, will be generally referred to as "openings".

In one embodiment, a connection according to this invention comprises two components, each having one or more off-center openings that must be aligned to one or more openings in the other, and each having either external or internal threads machined onto one end. The timing is done in such a fashion that when the two components are axially aligned such that the one or more openings are aligned, and mated together, the threads form a continuous unbroken thread across the junction between the components. The physical connection between the two components is provided by a threaded sleeve that initially screws onto one component and then screws onto the other component after the components are axially aligned and mated. When the connection is fully made-up, the sleeve's thread straddles the mating face between the components. This leaves approximately one-half of the sleeve's thread engaged onto the end of each of component.

The aspect of complete interchangeability of mating parts with a synchronized thread separates a connection according to this invention from any other connection of which we are aware. In one embodiment, the machining processes utilized to make the components of a connection according to this invention utilize a simple threaded master orientation cap and a master thread jig, which makes the synchronization process simple and effective. The fabrication process involves timing reference pin locations on component 10 (FIG. 1) relative to the thread lead and then adjusting the thread lead of the mating component 20 relative to these reference pin locations. The reference pin locations are predefined by the user and are machined into the body of the master thread jig. These reference pin locations are placed onto component 10 by threading the master orientation cap onto component 10, indicating the x-axis off of two alignment pins on the master orientation cap, transferring the reference pin locations onto the end of component 10, and then drilling reference holes at the predefined coordinates. All machining work on component 10 is done relative to these thread timing reference hole locations. This ensures that all ports and passages are positioned at a known location relative to the part's thread lead. The threads of the mating part (component 20, FIG. 1) are timed relative to the threads on component 10 through the use of a master thread jig. This master jig is identical in appearance to component 10 and sleeve 30 of FIG. 1, with two exceptions: (i) an access/viewing window has been milled into the side of sleeve 30 at an axial location that allows access to the mating plane between parts 10 and 20; and (ii) reference pins have been placed at the proper location to ensure proper thread alignment with the thread timing created by the master orientation cap. The threads on component 20 are timed relative to component 10 by first installing reference pin holes on the face of component 20 at the predefined reference pin coordinates. These pin holes can be transferred from the other end of a part if the holes were previously generated using the master thread cap, or the pin holes can be independently machined. If the reference pin hole locations are independently machined, the pin holes are not placed in a location that is timed relative to the thread lead. The pins in the master jig are then inserted into the reference holes in component 20 and the ends of the two parts are abutted together. The slotted collar is then screwed onto component 20. If the threads between the master thread jig and component 20 are not aligned then a gap will exist between the mating faces of the master thread jig and component 20. The degree of misalignment is proportional to the gap between the two faces. The gap between the two parts is then measured and the master thread jig is removed from component 20. Timing of the threads on component 20 is achieved by facing off material from the end of the part to adjust the tangential location where the thread lead starts relative to the reference pin locations. The proper amount to face off is one thread pitch minus the measured gap between the master thread jig and component 20. Upon completion of the facing operation, all machining on component 20 is performed relative to the two reference hole locations. Also, the STUB ACME thread form may be utilized, which greatly improves the resistance to thread galling, and allows for greater misalignment when assembling the connection.

In another embodiment, a connection according to this invention comprises two components, each having one or more off-center openings that must be aligned to one or more openings in the other, and each having either external or internal threads machined onto one end. No special machining process is used to time the threads of one component to the threads of the other component. The two components are aligned such that the one or more openings are aligned. If the two components are mated together such that the end of one abuts the end of another, the threads do not form a continuous, unbroken, thread. To form a connection according to this invention, the aligned components are separated by such a distance that if the threads on one component and the threads on the other component were continuous through the distance, they would form a continuous-thread path between the two components. The appropriate distance may be determined by one skilled in the art using well known techniques. A spacer that generates a separation substantially equal to the distance determined to be appropriate may be provided between the aligned components to maintain the separation. The spacer can be any suitable piece or device suitable for generating the separation, as will be familiar to those skilled in the art. Example spacers are shown in the drawings that illustrate this invention. The physical connection between the two components is created by a threaded sleeve that initially screws onto one component and then screws onto the other component after the components are axially aligned and appropriately spaced.

In one embodiment of this invention, a threaded connection for connecting first and second substantially cylindrical-shaped components having a pre-defined axial alignment comprises: A. (i) a first set of threads provided on a first component connection end of said first component, and (ii) a second set of threads provided on a second component connection end of said second component, (iii) such that when said first and second components are disposed in said pre-defined axial alignment and said first component connection end abuts said second component connection end, said first set of threads and said second set of threads are synchronous; and B. a connection collar adapted to be (i) threaded onto said first component connection end before said first component connection end abuts said second component connection end, and (ii) threaded onto said second component connection end, after said second component connection end abuts said first component connection end and said first and second components are disposed in said pre-defined axial alignment, while said pre-defined axial alignment is maintained. In one embodiment of this threaded connection, said first set of threads is externally disposed on said first component connection end and said second set of threads is externally disposed on said second component connection end. In another embodiment of this threaded connection, said first set of threads is internally disposed on said first component connection end and said second set of threads is internally disposed on said second component connection end. In another embodiment of this threaded connection, said first component has one or more openings therein that align with one or more openings in said second component when said first and second components are disposed in said pre-defined axial alignment. In another embodiment of this threaded connection, an item is disposed through at least one of said openings in said first component and through said aligned opening in said second component.

In one embodiment of this invention, a threaded connection for connecting first and second substantially cylindrical-shaped components having a pre-defined axial alignment comprises: A. (i) a first set of threads provided on a first component connection end of said first component, (ii) a second set of threads provided on a second component connection end of said second component, and (iii) said first and second components being disposed such that (i) said first component connection end is separated from said second component connection end by such a distance that if said first set of threads and said second set of threads were continuous through said distance they would form a continuous-thread path between said first component and said second component, and (ii) said first and second components are disposed in said pre-defined axial alignment; and B. a connection collar adapted to be (i) threaded onto said first component connection end before said first component connection end is separated from said second component connection end by said distance, and (ii) threaded onto said second component connection end, after said first component connection end is separated from said second component connection end by a distance and said first and second components are disposed in said pre-defined axial alignment, while said pre-defined axial alignment is maintained.

In another embodiment of this invention, a threaded connection for connecting first and second substantially cylindrical-shaped components having a pre-defined axial alignment comprises: A. a spacer having a first spacer end and a second spacer end, B. (i) a first set of threads having a first timing and provided on a first component connection end of said first component, and (ii) a second set of threads having a second timing and provided on a second component connection end of said second component, (iii) such that when said first component connection end abuts said first spacer end of said spacer and said second component connection end abuts said second spacer end of said spacer, when said first and second components are disposed in said pre-defined axial alignment, said first set of threads and said second set of threads are synchronous; and C. a connection collar adapted to be (i) threaded onto said first component connection end before said first component connection end abuts said first spacer end and said second spacer end abuts said second component connection end, and (ii) threaded onto said second component connection end, after said second component connection end abuts said second spacer end and said first spacer end abuts said first component connection end and said first and second components are disposed in said pre-defined axial alignment, while said pre-defined axial alignment is maintained.

In another embodiment of this invention, a threaded connection for connecting first and second substantially cylindrical-shaped components having a pre-defined axial alignment comprises: A. a spacer having a threaded end and a top end, B. (i) a first set of threads having a first timing and provided on a first component connection end of said first component, and (ii) a second set of threads having a second timing and provided on a second component connection end of said second component, (iii) such that when said first component connection end is attached to said threaded end of said spacer and said second component connection end abuts said top end of said spacer, when said first and second components are disposed in said pre-defined axial alignment, said first set of threads and said second set of threads are synchronous; and C. a connection collar adapted to be (i) threaded onto said first component connection end before said first component connection end is attached to said threaded end of said spacer and said top end of said spacer abuts said second component connection end, and (ii) threaded onto said second component connection end, after said second component connection end abuts said top end of said spacer and said threaded end of said spacer is attached to said first component connection end and said first and second components are disposed in said pre-defined axial alignment, while said pre-defined axial alignment is maintained.

DESCRIPTION OF THE DRAWINGS

The advantages of the present invention will be better understood by referring to the following detailed description and the attached drawings in which.

Figure 1:
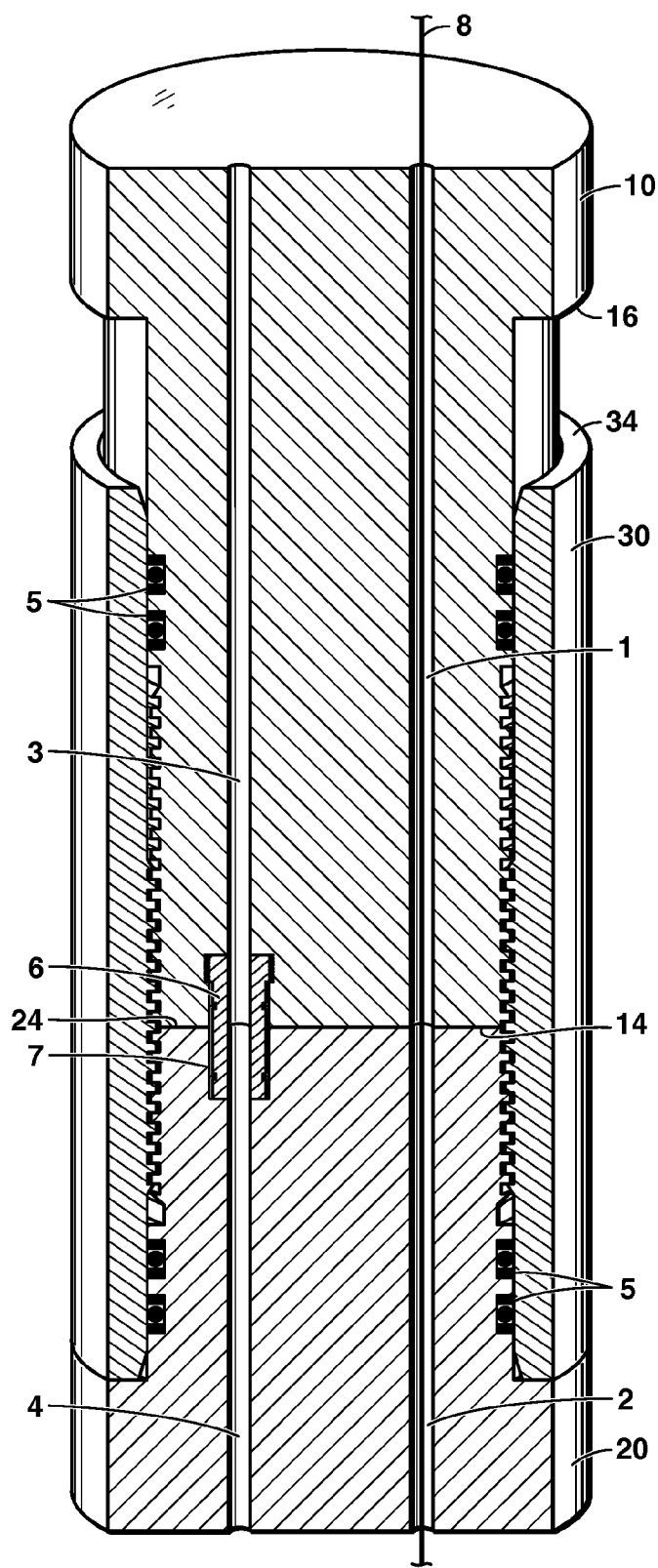
FIG. 1 is an off-center cut-away view of one embodiment of a threaded connection according to this invention.

The same identifier is used throughout the drawings for any particular part.

While the invention will be described in connection with its preferred embodiments, it will be understood that the invention is not limited thereto. To the extent that the following description is specific to a particular embodiment or a particular use of the invention, this is intended to be illustrative only, and is not to be construed as limiting the scope of the invention. On the contrary, the invention is intended to cover all alternatives, modifications, and equivalents which may be included within the spirit and scope of the present disclosure, as defined by the appended claims.

DETAILED DESCRIPTION OF THE INVENTION

FIG. 1-FIG. 4 illustrate one embodiment of this invention. In this embodiment, first component 10 must be connected to second component 20 in such a manner that the alignments of (i) opening 1 in first component 10 with opening 2 in second component 20, and (ii) opening 3 in first component 10 with opening 4 in second component 20, are maintained during the connection make-up process. As shown, wireline 8 may be provided through openings 1 and 2; and nipple 6 may be provided in opening 3 with nipple recipient 7 being provided in opening 4. External threads are provided on connection ends abutting mating faces 14 and 24 of components 10 and 20. The make-up process is initiated by threading connection sleeve 30 onto first component 10, preferably until connection sleeve end 34 abuts shoulder 16 of component 10. Second component 20 is then axially aligned with first component 10 such that opening 2 is aligned with opening 1 and opening 3 is aligned with opening 4. In the embodiment shown in FIG. 1-FIG. 3, nipple 6 is aligned with nipple recipient 7. With this alignment maintained, second component 20 is mated flush with first component 10 such that there is essentially no gap between mating face 24 and mating face 14. Connection sleeve 30 is then threaded across the mating face onto second component 20. Since the thread on component 10 is timed relative to the thread on component 20, the thread path extending from component 10 is in-line with component 20, and sleeve 30 follows a continuous thread across the mating face. The high strength and low profile nature of the resulting connection allows maximum use of the internal diameter of first component 10 and second component 20 for engineering purposes that may or may not rely upon precise axial alignment. Additionally, first component 10 and second component 20 can be fabricated such that there is essentially no external diameter upset (i.e., there is substantially constant external diameter across the connection).

Threads 12 of first component 10, and threads 22 of second component 20, can be formed by various machining techniques that enable the synchronization of the timing of the thread profiles. Sleeve 30 does not require any specialized machining processes because timing is not required. This fabrication process ensures that there is essentially no gap between mating face 14 of first component 10 and mating face 24 of second component 20 after connection sleeve 30 is screwed into placed. As illustrated in FIGS. 1-5, but particularly FIG. 1, sleeve or connection collar 30 includes an internal straight thread such that when first component 10 is in pre-defined axial alignment with component 20, collar 30 threads continuously from the first component 10 onto the second component 20.

Figure 2:
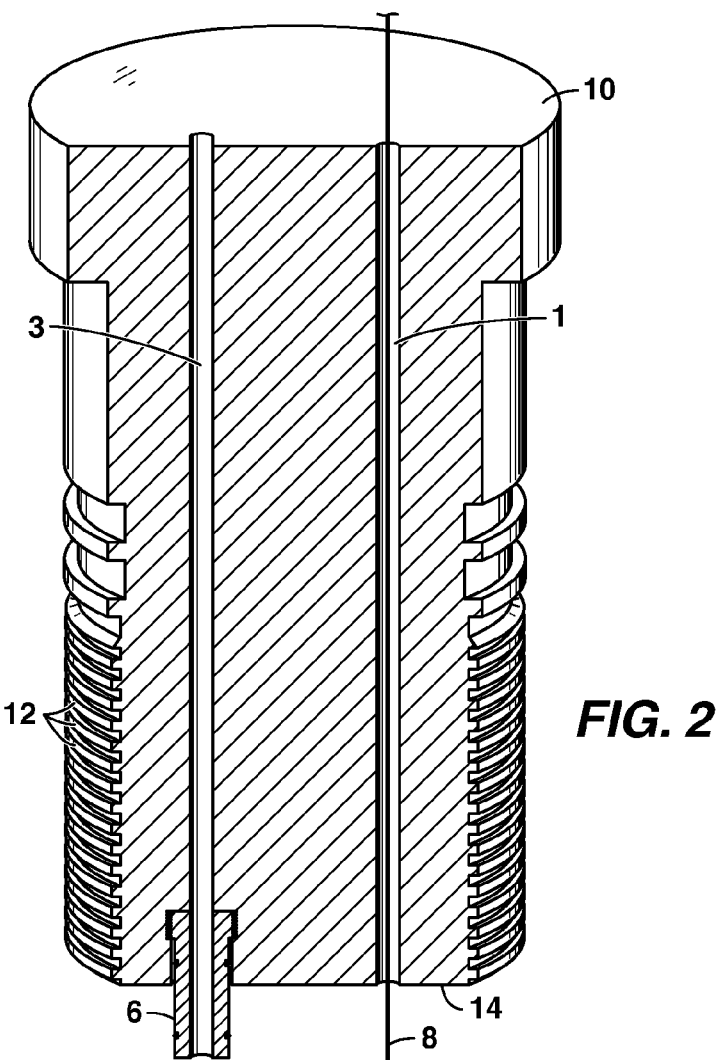
FIG. 2 is an off-center cut-away view of one component used in making the threaded connection illustrated in FIG. 1.
Figure 3:
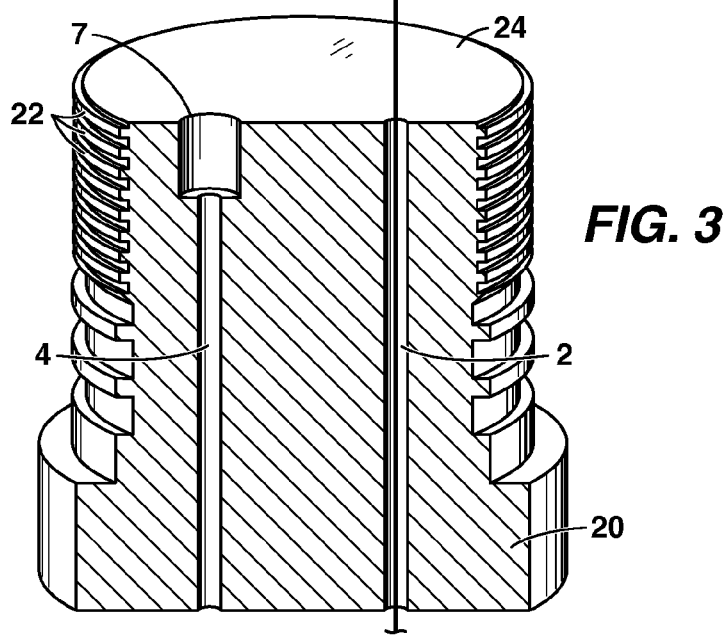
FIG. 3 is an off-center cut-away view of another component used in making the threaded connection illustrated in FIG. 1.
Figure 4:
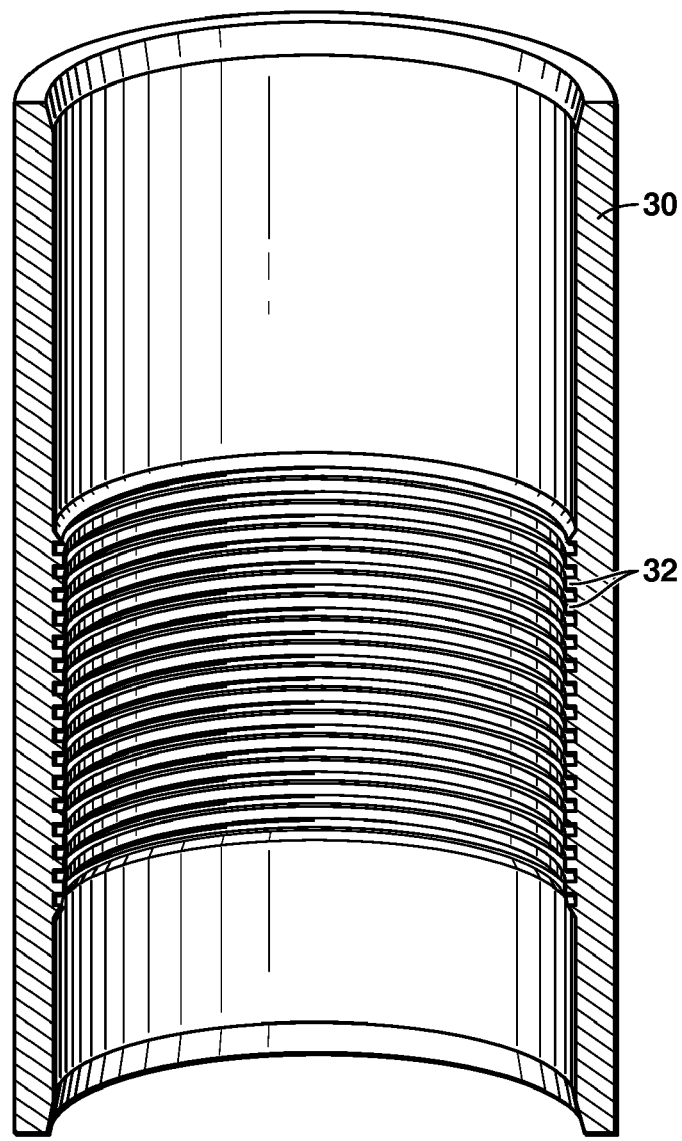
FIG. 4 is a cut-away view of a connection collar used in making the threaded connection illustrated in FIG. 1.
Figure 5A:
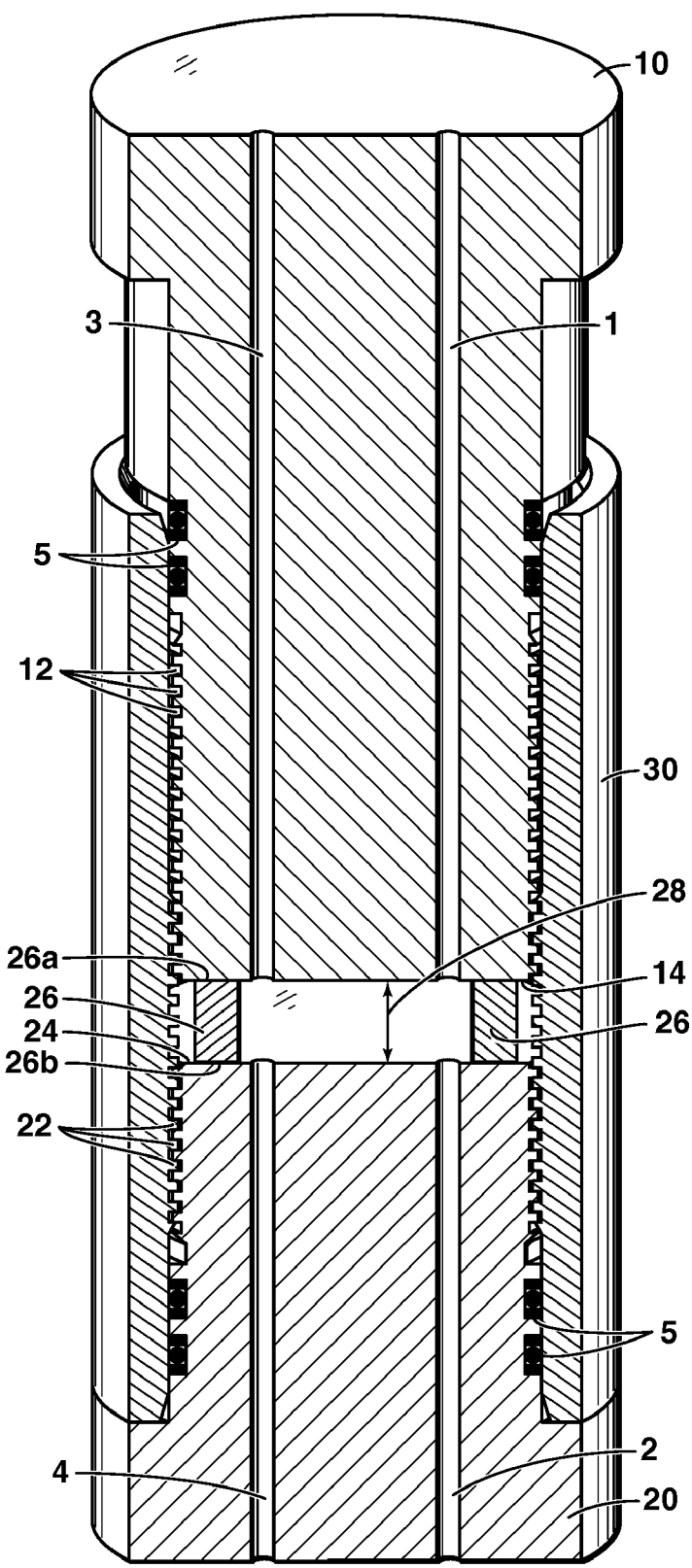
FIG. 5A is an off-center cut-away view of an embodiment of a threaded connection according to this invention in which one or more spacers are utilized.
Figure 5B:
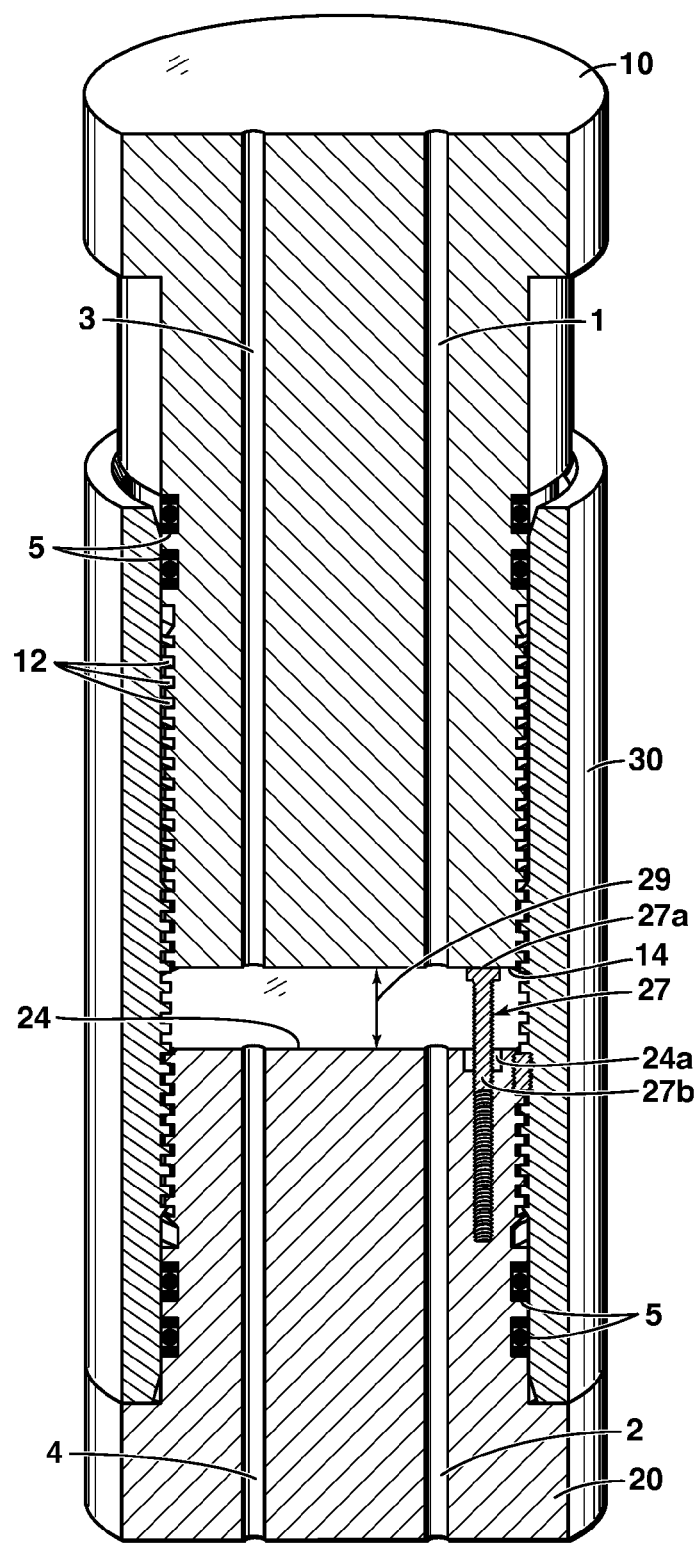
FIG. 5B illustrates one embodiment of a spacer that can be utilized in this invention.

FIG. 5A illustrates another embodiment of this invention. In this embodiment, mechanical synchronization of the timings of threads 12 and threads 22 is not required. Instead, first component 10, having connection sleeve 30 already threaded thereon, and second component 20 are placed in the proper axial alignment, i.e., such that any openings that need to be aligned, are aligned. For example, in the embodiment illustrated in FIG. 5A, opening 1 in first component 10 is aligned with opening 2 in second component 20 and opening 3 in first component 10 is aligned with opening 4 in second component 20. During the connection make-up process, first component 10 and second component 20 are separated, while the alignment of openings 1 and 2 and of openings 3 and 4 is maintained, until the distance between first component 10 and second component 20 (the "required distance") is such that if threads 12 and threads 22 were continuous through the required distance, they would form a continuous-thread path between first component 10 and second component 20. Proper alignment of the openings between component 10 and component 20 can be provided using alignment pins, or nipples 6 and nipple recipients 7, that mate between the components, e.g., through openings 1 and 2 or through openings 3 and 4, as illustrated in FIGS. 1-3. The required distance between first component 10 and second component 20 may be maintained by a spacer. For example, a spacer 26 may be placed between components 10 and 20 such that a first end 26a of spacer 26 abuts mating face 14 of component 10 and a second end 26b of spacer 26 abuts mating face 24 of component 20. In this example, spacer 26 is a suitable piece of metal, as will be familiar to those skilled in the art. The spacer 26 may be sized to space the first and second components by a desired stand-off separation distance 28. In another embodiment, illustrated in FIG. 5B, a spacer 27 is adjustable and is in the form of a screw. A threaded end 27b of a spacer 27 is screwed into component 20 via mating face 24 until the proper stand-off separation distance 29 is achieved as shown, and a top end 27a of spacer 27 abuts mating face 14 of component 10. In an alternative embodiment and as illustrated in FIG. 5B, an indention 24a is provided in component 20 at mating face 24. In this embodiment, stand-off separation distance 29 is preferably equal to the distance of one thread pitch or less. Once the required distance is maintained, connection sleeve 30 is threaded from first component 10 to second component 20. In yet another embodiment, the connection can be made up without a spacer by physically moving component 20 axially away from component 10 until the required distance is achieved and connection sleeve 30 is threaded from first component 10 to second component 20 at least until the threads of sleeve 30 engage with the threads on component 20. Other embodiments, either using a spacer or not, to generate the required distance are within the scope of this invention. Once the required distance is maintained, connection sleeve 30 is threaded from first component 10 to second component 20. The required distance between mating faces 14 and 24 can range from zero to several thread pitches. Any or all parts of a connection according to this invention may be coated with a suitable coating to provide protection from galling and/or corrosion, as will be familiar to those skilled in the art.

Unlike the connection type described earlier that relies upon an unthreaded free rotating collar, a connection according to this invention provides threads on both sides of the connection, thus enabling maximum use of the internal diameter, and maximum strength. The inclusion of seals on each end of the connection enables the region internal to connection sleeve 30 to be pressure isolated from the region external to connection sleeve 30; for example, see seals 5 in FIG. 1. Openings 1, 2, 3, and 4, e.g., may be used for numerous engineering endeavors, for example, electrical plug type connections, nipples that provide sealed or unsealed fluid passage from one component to another, wireline passages, visualization passages for optical access, laser beam communication, ball or plug passage, or any other communication type that requires, or can otherwise utilize, off-center alignment between two mating components.

EXAMPLE

A full-scale model of a connection according to this invention was constructed to allow pressure testing of the required connection tensile strength. A pressure of about 8.1 MPa (15 ksi) was applied to the internal chamber of the connection which induced the required 486,000 Newton's (109,000 lbs) tensile strength needed for the connection to perform in actual field conditions. Disassembly of the model showed no signs of material deformation, or galling of the threads.

While the present invention has been described in terms of one or more preferred embodiments, it is to be understood that other modifications may be made without departing from the scope of the invention, which is set forth in the claims below.

We claim:
1. A threaded connection comprising:
A. a spacer having a threaded end and a top end,
B. (i) a first set of threads having a first timing and provided on a first component connection end of a first component and
   (ii) a second set of threads having a second timing and provided on a second component connection end of a second component,
   (iii) such that when said second component connection end is attached to said threaded end of said spacer and said first component connection end abuts said top end of said spacer when said first and second components are disposed in a pre-defined axial alignment, said first set of threads and said second set of threads are synchronous, and none of the first set of threads overlap with any of the second set of threads; and
C. a connection collar adapted to be (i) threaded onto said first component connection end, and (ii) threaded onto said second component connection end after said first component connection end abuts said top end of said spacer and said threaded end of said spacer is attached to said second component connection end and said first and second components are disposed and maintained in pre-defined axial alignment while said connection collar is threaded onto said second component connection end.

2. The threaded connection of claim 1 wherein said first set of threads is externally disposed on said first component connection end and said second set of threads is externally disposed on said second component connection end.

3. The threaded connection of claim 1 wherein said first component has one or more openings therein that align with one or more openings in said second component when said first and second components are disposed in said pre-defined axial alignment.

* * * * *